(12) United States Patent
Singh et al.

(10) Patent No.: US 7,777,481 B2
(45) Date of Patent: Aug. 17, 2010

(54) LINEAR MOTION ASSEMBLY HAVING A SELF-ENERGIZING SENSING DEVICE AND METHOD OF DETECTING MOVING FERROUS ELEMENTS IN A LINEAR MOTION ASSEMBLY

(75) Inventors: Bir Inder Singh, Saginaw, MI (US); Forrest Scott Seitz, Beaverton, OR (US)

(73) Assignee: Danaher Motion, LLC, Saginaw, MI (US)

( * ) Notice: Subject to any disclaimer, the term of this patent is extended or adjusted under 35 U.S.C. 154(b) by 370 days.

(21) Appl. No.: 11/772,311

(22) Filed: Jul. 2, 2007

(65) Prior Publication Data

US 2009/0009158 A1 Jan. 8, 2009

(51) Int. Cl.
  *G01B 7/14* (2006.01)
  *G01B 7/30* (2006.01)
(52) U.S. Cl. ............... 324/207.15; 324/207.25; 324/207.26; 324/207.24; 324/174
(58) Field of Classification Search ............ None
  See application file for complete search history.

(56) References Cited

U.S. PATENT DOCUMENTS

| | | | | |
|---|---|---|---|---|
| 2,983,141 A | * | 5/1961 | Vanator | 73/162 |
| 4,384,252 A | * | 5/1983 | Kolter | 324/239 |
| 5,003,259 A | * | 3/1991 | Palazzetti et al. | 324/207.14 |
| 7,298,131 B2 | * | 11/2007 | Jones | 324/117 R |
| 2005/0083041 A1 | * | 4/2005 | Schwartzbart | 324/207.17 |

* cited by examiner

Primary Examiner—Jay M Patidar
(74) Attorney, Agent, or Firm—Dickinson Wright, PLLC (57) ABSTRACT

A self-energizing, non-contacting sensing device for detecting movement of ferrous elements, methods of use and assemblies therewith. The device includes a permanent magnet, a pair of ferrous conductors, an inductor coil and a microprocessor. The ferrous conductors are attached to the permanent magnet with free ends of the ferrous conductors being spaced from one another to provide a gap. The gap provides an open circuit in the absence of the moving ferrous elements and a substantially closed circuit in the presence of the moving ferrous elements. When the circuit alters between open and closed states, in the absence and presence of the moving ferrous elements, respectively, an electromotive force imparted on the inductor coil generates an alternating current. The microprocessor is configured to detect the alternating current produced in the inductor coil, and thus, can assess whether the ferrous elements are moving in a normal or abnormal manner.

9 Claims, 10 Drawing Sheets

LINEAR MOTION ASSEMBLY HAVING A SELF-ENERGIZING SENSING DEVICE AND METHOD OF DETECTING MOVING FERROUS ELEMENTS IN A LINEAR MOTION ASSEMBLY

BACKGROUND OF THE INVENTION

1. Technical Field

This invention relates generally to sensing devices for detecting movement of ferrous elements, such as rolling elements in linear and rotational motion devices and gear teeth in gear trains.

2. Related Art

Linear motion assemblies, such as lead screws, linear rail and carriage assemblies, and ball screws, and rotational motion assemblies, such as bearings and gear trains, are used in a numerous industries, such as the machine tool, automotive, aircraft and aerospace industries, to effect linear or rotational movement of one body relative to another body. Typically, these assemblies are constructed to have life spans approximating their projected period of use. A ball screw assembly, for example, has a life span that is generally expressed as a function of the number of inch cycles that either the ball screw and/or ball nut will travel under a given load and at a given rotational speed. As such, when a ball screw assembly or any of the other of the assemblies mentioned above for effecting relative movement is in use, a routine maintenance schedule is generally adopted calling for periodic inspections to determine whether the respective assemblies are functioning properly. Though routine maintenance schedules can prove beneficial in making use of more of the full useful life of the respective assemblies, such schedules do not permit an unforeseen problem to be detected as the problem is developing in real-time. As such, some of the potentially useful life of the respective assemblies may be unused when replaced, according to schedule, in advance of any unacceptable deterioration. Also, deterioration that occurs in advance of the estimated useful life of assemblies may go undetected until failure occurs.

SUMMARY OF THE INVENTION

A self-energizing, non-contacting sensing device for detecting movement of ferrous elements has a permanent magnet with a pair of ferrous conductors, an inductor coil and a microprocessor. One of the ferrous conductors has an end attached to the permanent magnet to carry magnetic flux density from the magnet and the other of the ferrous conductors has an end attached to the permanent magnet to return the magnetic flux density to thereto. Each of the ferrous conductors has a free end opposite the ends attached to the permanent magnet. The inductor coil is wound about one of the ferrous conductors with the inductor coil being arranged in communication with the microprocessor. The free ends of the ferrous conductors are spaced from one another to provide a gap. The gap provides a substantial reluctance in the absence of the moving ferrous elements to diminish the electromotive force imparted on the inductor coil. The gap is substantially closed in the presence of the moving ferrous elements to diminish the reluctance across the gap, and in turn, the electromotive force imparted on the inductor coil is substantially increased. The microprocessor is configured to detect the presence of the moving ferrous elements across the gap from the increased electromotive force imparted on the inductor coil and also the absence of the moving ferrous elements across the gap from the diminished electromotive force imparted on the inductor coil.

Another aspect of the invention provides a linear motion assembly. The linear motion assembly has a first body, a second body, with a plurality of ferrous rolling elements disposed between the first body and the second body to enable low friction translation of the first body and the second body relative to one another. Further, the assembly includes a permanent magnet carried by one of the first body or the second body and a pair of ferrous conductors. One of the ferrous conductors is attached to the permanent magnet to carry magnetic flux therefrom and the other of the ferrous conductors is attached to the permanent magnet to return the magnetic flux thereto, with each of the ferrous conductors having a free end. The assembly further has an inductor coil wound about one of the ferrous conductors, with the inductor coil being arranged in communication with a microprocessor. The free ends of the ferrous conductors are spaced from one another by a gap to provide an open circuit between the free ends. The gap is substantially closed by the presence of the ferrous rolling elements to provide a closed circuit, whereupon the closed circuit imparts an electromotive force on the inductor coil. As such, the microprocessor detects the presence of the ferrous rolling elements closing the gap from the electromotive force, while also detecting the absence of the ferrous rolling elements across the gap from the open circuit.

Another aspect of the invention provides an assembly for creating one of relative rotational or translational movement. The assembly includes a first body, a second body and a plurality of ferrous elements arranged to enable low friction movement of the first body and the second body relative to one another. Further, the assembly includes a permanent magnet and a pair of ferrous conductors. One of the ferrous conductors is attached to the permanent magnet to carry magnetic flux therefrom and the other of the ferrous conductors is attached to the permanent magnet to return the magnetic flux thereto, with each of the ferrous conductors having a free end. The assembly further has an inductor coil wound about one of the ferrous conductors, with the inductor coil being arranged in communication with a microprocessor. The free ends of the ferrous conductors are spaced from one another by a gap to provide an open circuit between the free ends. The gap is substantially closed by the presence of the ferrous elements to provide a closed circuit, whereupon the closed circuit imparts an electromotive force on the inductor coil. As such, the microprocessor detects the presence of the ferrous elements closing the gap from the electromotive force, while also detecting the absence of the ferrous elements across the gap from the open circuit.

Yet another aspect of the invention includes a method of detecting movement of ferrous elements in an assembly creating one of linear or rotational motion. The method includes providing a permanent magnet and attaching an end of a first ferrous conductor to the permanent magnet and arranging a free end of the first ferrous conductor in a predetermined location relative to the ferrous elements. Further, attaching an end of a second ferrous conductor to the permanent magnet and arranging a free end of the second ferrous conductor in a predetermined location relative to the ferrous elements to provide a gap between the free ends, with the gap being sized to be open in the absence of the ferrous elements and substantially closed in the presence of the ferrous elements. Next, disposing an inductor coil about one of the ferrous conductors and arranging a microprocessor in communication with the inductor coil. Then, configuring the microprocessor to detect the presence of the ferrous elements upon their closing the gap and to detect the absence of the ferrous elements across the gap.

Each of the above preferred embodiments provides a sensing device including the permanent magnet, ferrous conductors, inductor coil and microprocessor for detecting the movement of the ferrous elements without the need for an external power source. The power used for the device is derived from the magnetic flux of the permanent magnet that is communicated through the ferrous conductors. Accordingly, aspects, features and advantages provided by the sensing device, for example, result in reduced component cost, increased manufacturing efficiencies, reduced weight, along with providing an enhanced useful life.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
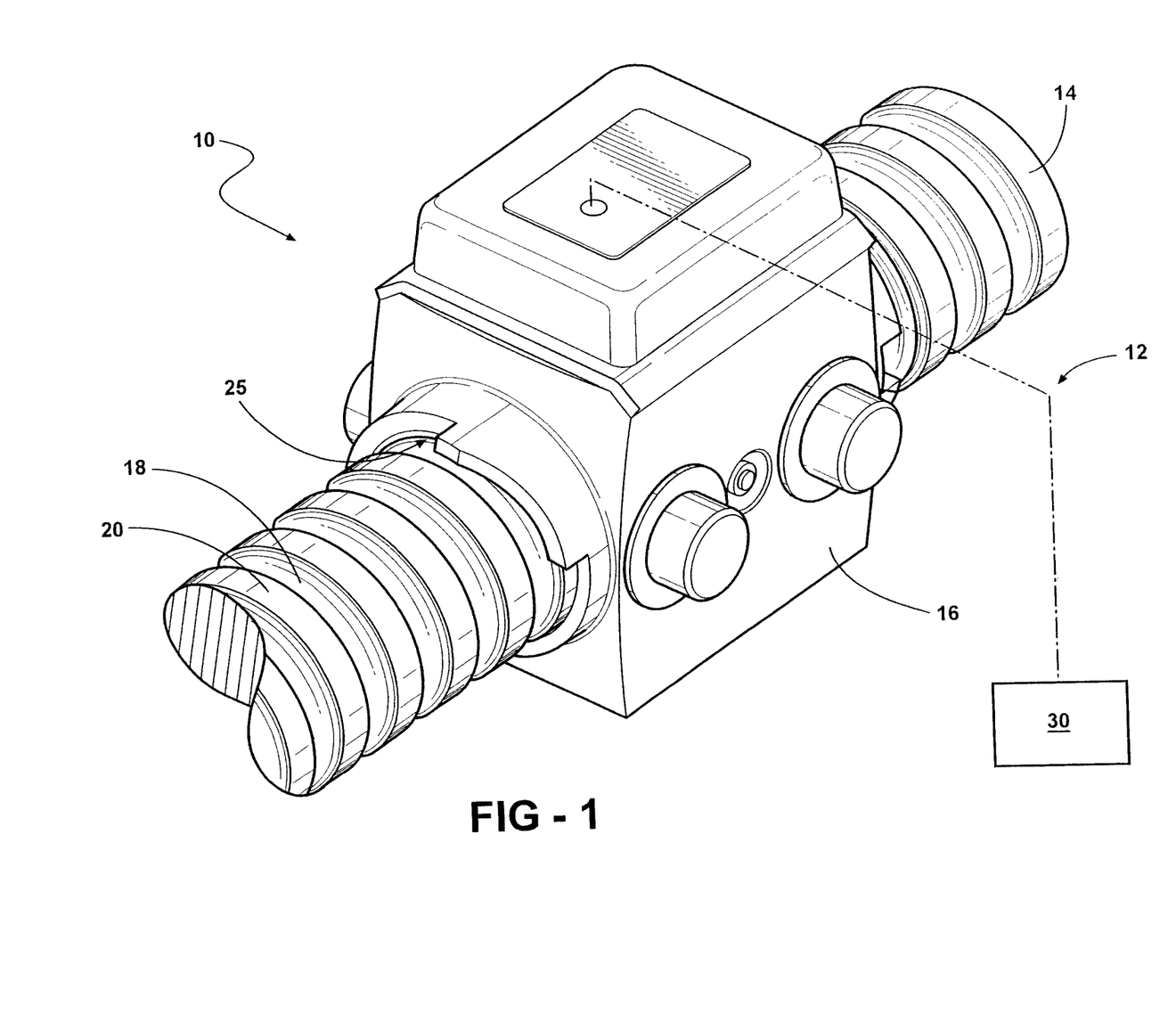
FIG. 1 is a perspective view of ball screw assembly system with a self-sensing energized sensing device according to one presently preferred aspect of the invention.

Referring in more detail to the drawings, FIG. 1 illustrates a linear motion system or assembly generally at 10 constructed having a monitoring system indicated generally at 12 according to one presently preferred embodiment of the invention. The system 10 has a first body, represented here, for example, as an elongate ball screw 14 arranged for operable communication with a second body, shown here as a ball nut 16, for example, for translation of the screw 14 and nut 16 relative to one another. The ball screw 14 is constructed from a cylindrical shaft and includes a generally continuous helical external groove 18 provided by a helical external thread 20, while, as shown best in FIGS. 4 and 5, the ball nut 16 has a generally continuous helical internal groove 22 defined by a helical internal thread 24. The helical groove 22 of the ball nut 16 cooperates with the helical groove 18 of the ball screw 14 to transform rotation of either the ball nut 16 or ball screw 14 into linear motion of the other of the ball nut 16 and ball screw 14. The helical grooves 18, 22 define opposite raceway portions of a ball circulating track 25 for receipt of a plurality of ferrous rolling elements, referred to hereafter as balls 26 (FIG. 5). Under normal operating conditions, the balls 26 are free to move along the raceways and circulate around the ball track 25 as the nut 16 and screw 14 rotate and translate relative to one another, wherein the balls 26 provide a significant reduction in friction between the nut 16 and the screw 14. The monitoring system 12 is arranged in communication with the balls 26 of the assembly 10 via a self-energizing, non-contacting sensing device 28, illustrated here in accordance with one presently preferred construction, so that one or more selected performance-indicating characteristic of the system 10 can be detected and monitored in real-time while the system 10 is in use.

Figure 7:
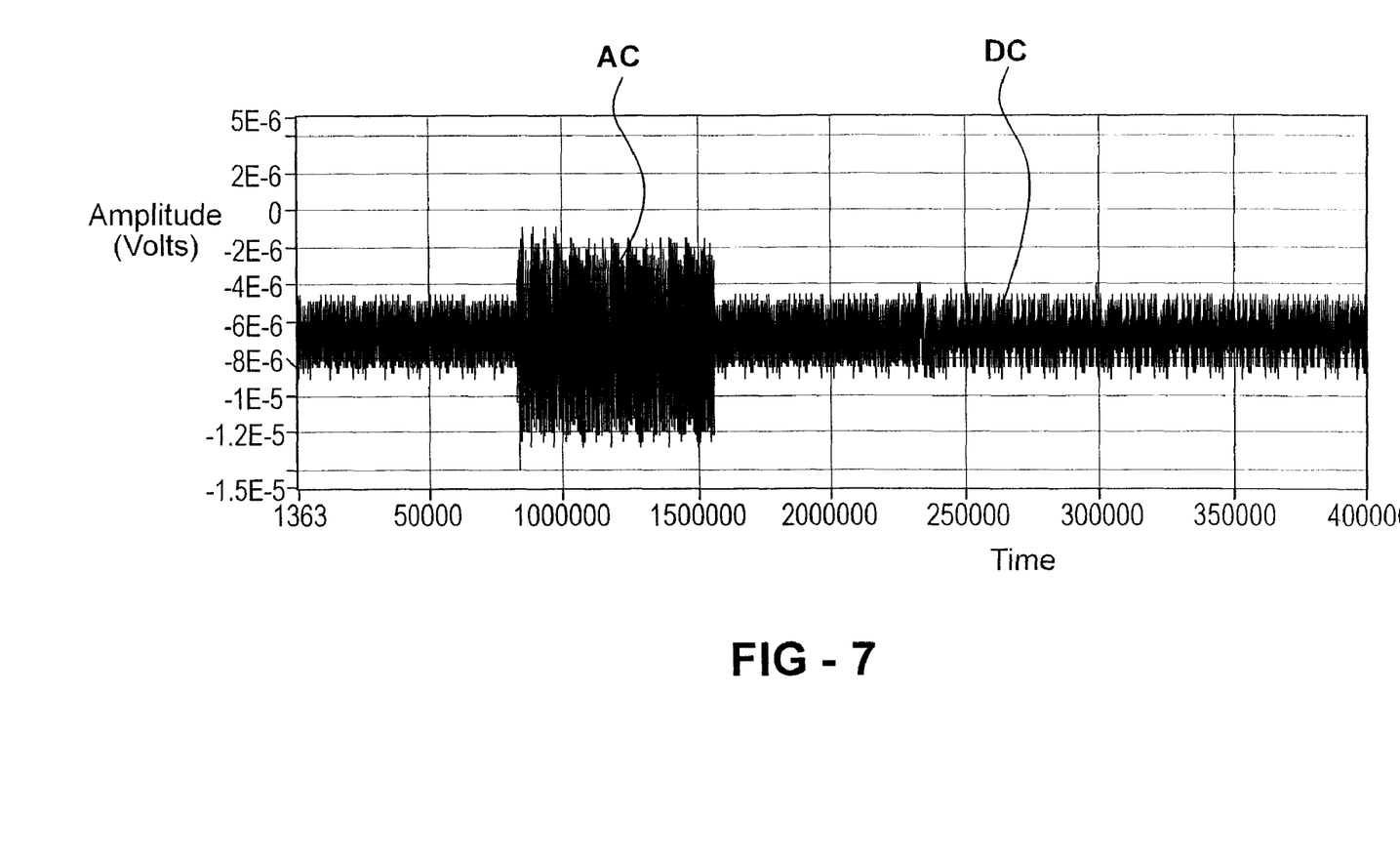
FIG. 7 is a graph showing both normal and abnormal signals received by a microprocessor of the sensing device.

The sensing device 28 is carried by the ball screw 14 and/or the ball nut 16, and is shown here by way of example as the being carried by the ball nut 16. The sensing device 28 is positioned in a non-contacting relation to the balls 26 to detect and monitor information related to performance-indicating characteristics of the system 10, the ball screw 14, and/or the ball nut 16 and to transmit corresponding signals to the monitoring system 12, as shown in FIG. 7. The sensing device 28 is arranged in communication with at least one signal receiver, such as a control module 30. The control module 30 can be configured to monitor and compare one or more selected performance-indicating characteristics of the linear motion assembly 10 by monitoring corresponding information received from the sensing device 28. The control module 30 can further be configured to detect and provide an indication of a discrepancy in the selected performance-indicating characteristic. Accordingly, as conditions, such as increased lash and/or jamming, for example, arise within the assembly 10, the monitoring system 12 can alert an operator in real-time so that immediate attention can be given to the assembly 10 to extend its useful life, or, if necessary, to replace the system 10 or components parts thereof.

Figure 2:
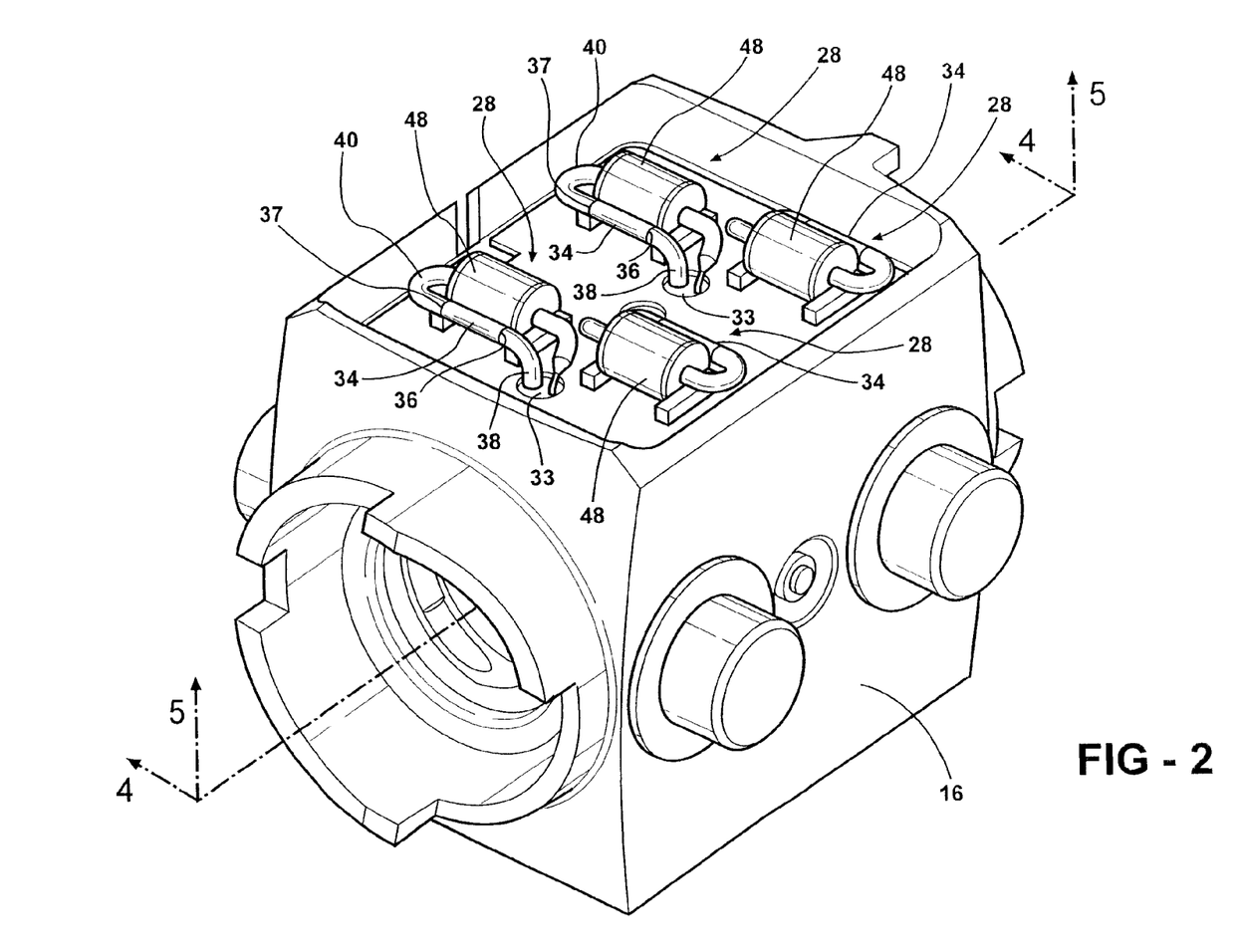
FIG. 2 is a perspective view of a ball nut from the ball screw assembly shown with a cover removed therefrom to expose a portion of the self-energized sensing device.
Figure 3:
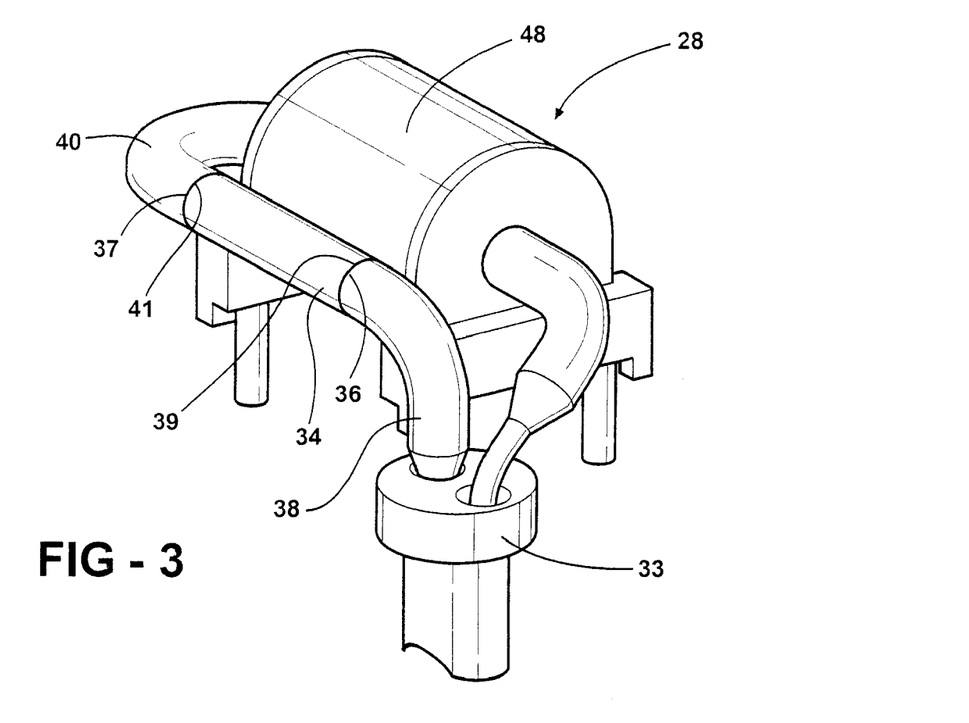
FIG. 3 is a perspective view of a portion of the self-energized sensing device.
Figure 4:
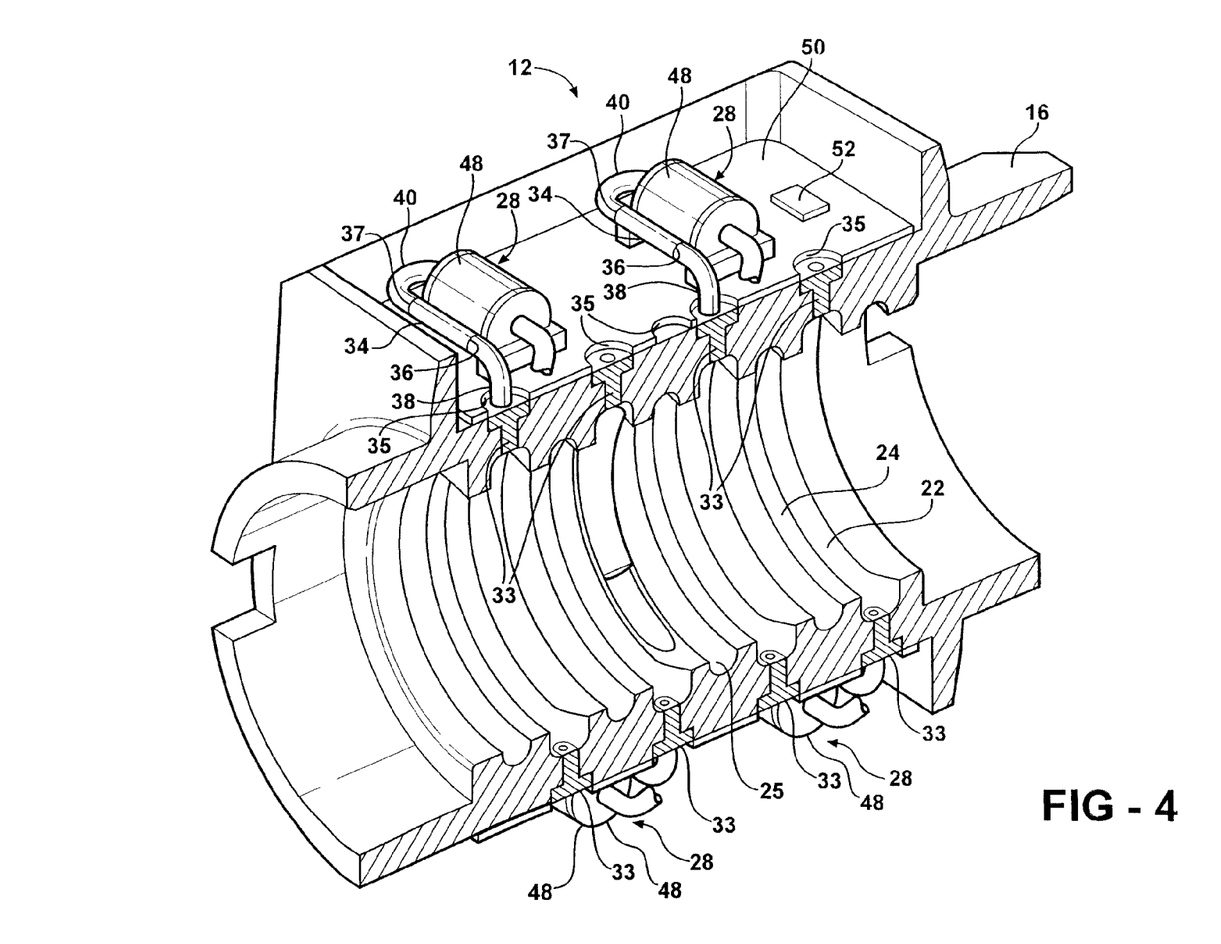
FIG. 4 is a cross-sectional view taken generally along line 4-4 of FIG. 2.
Figure 5:
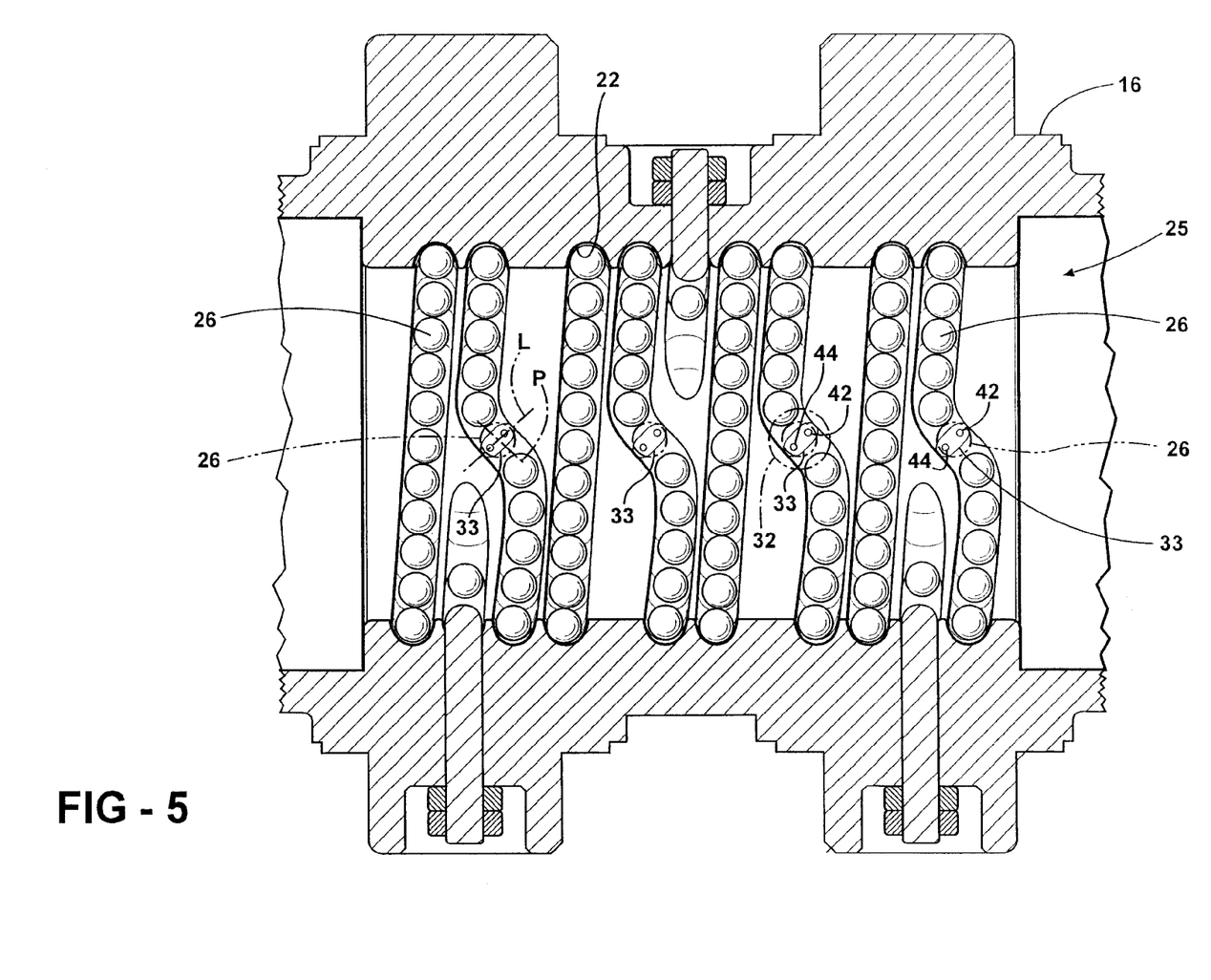
FIG. 5 is a cross-sectional view taken generally along line 5-5 of FIG. 2.
Figure 6:
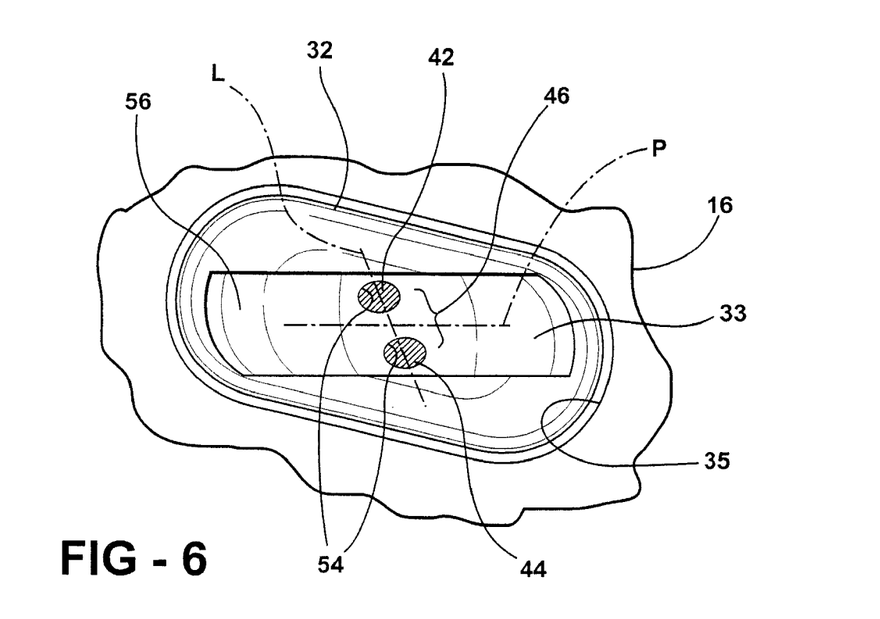
FIG. 6 is a bottom plan view of an insert with sensor tips of the self-sensing energized sending device received therein.

As best shown in FIGS. 2-4, the sensing device 28 has a permanent magnet 34 with a north pole 36 and a south pole 37 at its opposite ends. As best shown in FIG. 3, the device 28 has a first ferrous conductor 38 with an end 39 attached to the north pole 36 to carry magnetic flux density, simply referred to as magnetic flux hereafter, from the magnet 34 and a second ferrous conductor 40 with an end 41 attached to the south pole 37 to return magnet flux to the magnet 34 upon the circuit between the north and south poles 36, 37 being substantially complete. The ferrous conductors 38, 40 can be provided as any suitable ferrous containing material, whether being a ferrous containing composite, or wires, such as soft iron wires, for example. As shown in FIGS. 5 and 6, each of the ferrous conductors 38, 40 extends to a free end 42, 44, respectively. The free ends 42, 44 are spaced from one another by a gap 46 of a predetermined size, such that the gap 46 provides an open circuit between the ferrous conductors 38, 40 in the absence of a ferrous conductor spanning the gap 46. The sensing device 28 further includes an inductor coil 48 disposed about the second ferrous conductor 40, thereby locating the inductor coil downstream from the gap 46. The inductor coil 48 is provided having a suitable number of windings to detect the electromotive force generated from the flow of the magnet flux through the second ferrous conductor 40 upon the gap 46 being substantially closed. As shown in FIG. 4, the inductor coil 48 is preferably mounted to a printed circuit board (PCB) 50 having a microprocessor 52 thereon, wherein the microprocessor 52 is arranged in close proximity and in communication with each of the inductor coils 48. In addition, the microprocessor 52 is arranged in communication with the monitoring system 12 to allow information exchange therebetween. Accordingly, the sensing device 28 can be provided as a one-piece subassembly to facilitate attachment to the linear motion assembly 10.

As best shown in FIG. 5, the ball circulating track 25 includes at least one, and represented here, by way of example and without limitations, as eight ball returns 32. The ball returns 32 are represented here as being internal ball returns, with four being on one side of the ball nut 16 and four being on a diametrically opposite side of the ball nut 16. It should be recognized, however, that the ball returns 32 can be provided as any desired type, such as at opposite ends of the nut 16, or as external tube-type returns, as is known and shown in FIGS. 8 and 9, discussed hereafter.

As shown in FIG. 5, the free ends 42, 44 of the sensing devices 28 are arranged for operable communication with the balls 26 in the assembly 12 to detect the presence of the balls 26 as they pass in front of the free ends 42, 44. Given the illustrated ball screw assembly 10 has eight separate circulating tracks 25, eight sensing devices 28 are incorporated in the assembly 10 to monitor each circulating track 25. The sensing devices 28 are preferably positioned within the region of the ball returns 32, with the free ends 42, 44 being received in the ball returns 32, to detect the presence of each ball 26 as each ball 26 enters the ball return 32, as ball jam conditions typically originate within this region. In addition, by incorporating the sensing devices 28 at least partially within the ball returns 32, assembly is simplified, however, it is contemplated that the sensing devices 28 could be located in any suitable position within the ball nut 16.

As shown in FIGS. 4 and 5, the free ends 42, 44 of the ferrous conductors 38, 40 are disposed in inserts 33 constructed of non-conductive material, which are in turn disposed in openings 35 of the ball nut 16. The free ends 42, 44 are received in through openings 54 in the inserts 33, wherein the through openings 54 are preferably formed for a close fit with the free ends 42, 44, such that the free ends can be press fit therein. In addition, a suitable adhesive, resin or epoxy can be used to maintain the free ends 42, 44 in their desired location within the through openings 54. Likewise, the inserts 33 are preferably sized for a close fit within the openings 35 in the ball nut 16. The free ends 42, 44 are preferably inserted in substantially flush arrangement with an inner surface 56 of the ball returns 32 so that the circulating ball track 25 has a continuous, uninterrupted surface upon which the balls can roll. As such, the free ends 42, 44 of the sensing device 28 do not interfere with the normal operation of the ball screw assembly 10, as they do not obstruct the balls 26 from their normal direction of rolling travel. The free ends 42, 44 are spaced to provide the gap 46 therebetween, wherein the gap 46 provides sufficient reluctance to interrupt the flow of the magnetic flux from the first ferrous conductor 38 to the second ferrous conductor 40. As such, in the absence of a ball 26, an open circuit is established in the sensing device 28 across the free ends 42, 44. However, the gap 46 is sized such that when the balls 26 circulate through the ball returns 32, each ball 26 temporarily substantially closes the corresponding gap 46 as it passes in front of the free ends 42, 44, thereby creating a closed circuit in the sensing device 28. As such, the magnetic flux flowing through the first ferrous conductor 38 is able to flow across the gap 46, through the corresponding ball 46, and from the first ferrous conductor 38 to the second ferrous conductor 40. To maximize the ability of the sensing device 28 to detect the balls 26, the free ends 42, 44 are preferably oriented such that a line (L) constructed therebetween is generally perpendicular to the path (P) of the recirculating balls 26. As such, as the balls 26 pass the free ends 42, 44, the distance from the balls 26 to each of the free ends 42, 44 is substantially the same. Accordingly, when the balls 26 pass directly beneath the free ends 42, 44, the gap 46 is minimized and substantially closed.

Under normal operating conditions of the ball screw assembly 10, the magnetic flux flowing through the second ferrous conductor 40 changes with time, given the balls 26 are constantly traversing the gap 46. As such, as known per Farraday's Law, the change in magnetic flux over time generates current in the inductor coil 48 surrounding the second ferrous conductor 40. The current generated in the windings of the inductor coil 48 is on the order of microamperes, as shown, by way of example, in FIG. 7. The balls 26 re-circulating through the ball return 32 cause the gap 46 to be repeatedly closed and opened, thereby establishing a constantly varying alternating current (AC) generated within the inductor coil 48. Accordingly, under normal operation, wherein the ball screw assembly 10 is functioning properly, a pulsed AC microampere current is generated in the coil 48, which in turn communicates via the PCB 50 with the microprocessor 52, wherein the microprocessor 52 can determine if the operating condition of the ball screw assembly 10 is normal, or abnormal, thereby indicating that a problem exists. In addition, under at least one abnormal operating condition, such as when a ball jam occurs, a constant DC microampere current is generated in the coil 48, thereby alerting the user that a problem exists. It should be recognized that a single microprocessor 52 can be arranged in communication with all the inductor coils 48 from both sides of the ball nut 16, wherein the PCB's 50 on the opposite sides of the ball nut 16 are brought into communication with one another by a conductor wire (not shown).

The microprocessor 52 and/or control module 30 may be programmed to use the frequency and amplitude of the current sent from the inductor coil 48 to calculate and monitor various characteristics of the assembly 10, including ball pass speed, or translational velocity (Ve), which can then be used to calculate the rotational velocity of the ball screw 14. The translational or "exit" velocity (Ve) is preferably determined by correlating the frequency of the passing balls 26 to a translational velocity value. It is known that, with a rotating screw, translational velocity of a pitch circle of the balls can be calculated according to the following equation: $V_e = (\pi \times D_{bp} \times V_r)/24 \times [1-(D_b/D_{bp}) \times \cos\theta]$ Where $D_{bp}$=ball pitch diameter, $V_r$=ball screw rotational velocity, $D_b$=ball diameter, and [θ]=contact angle. Therefore, with the translational velocity $V_e$ of the balls, the ball pitch diameter $D_{bp}$, the ball diameter $D_b$, and the contact angle [θ] all known, the rotational velocity $V_r$ of the ball screw 14 can be calculated. The rotational velocity $V_r$ of the ball screw 14 can then be used to calculate the axial position of the ball nut 16 relative to the screw 14, given that the lead of the ball screw 14 is also known. As such, the sensing device 28, in addition to functioning as a ball jam detector, can be used to determine the relative axial position of the ball screw 14 relative to the ball nut 16. In other words, the sensing device 28 is configured and positioned to detect the passage of balls, whereupon the microprocessor and/or control module 30 may be programmed to calculate ball pass speed in response to a detected frequency of ball passage, the rotational velocity of the ball screw 14 based on the ball pass speed, and the axial position of the ball nut 16 relative to the ball screw 14 based on the rotational velocity of the ball screw 14. This information can all be utilized to determine if the ball screw assembly 10 is functioning properly, or if service is needed.

The control module 30 and/or microprocessor 52 may also be programmed to calculate and monitor ball wear. As the balls 26 wear their diameters decrease. Consequently, the re-circulating balls 26 have to roll faster to cover same distance in the same period of time. Accordingly, the control module 30 and/or microprocessor 52 is able to calculate and monitor the progressive decrease in the diameters of the balls by continuously or periodically solving the equation $V_e=(\pi \times D_{bp} \times V_r)/24 \times [1-(D_b/D_{bp}) \times \cos\theta]$ for $D_b$ using real-time measured exit velocity (Ve) values. The control module 30 and/or microprocessor 52 may also be programmed to alert an operator when the ball diameter value decreases below a predetermined minimum acceptable value.

Other values can be correlated via the current detected by the inductor coil 48 to ensure that the assembly 10 is functioning properly. The control module 30, for example, may be programmed to compare the calculated rotational velocity (RPM) of the ball screw 14 to an actual rotational velocity of the ball screw 14, such as may be determined via another sensor (not shown). If the actual rotational velocity and calculated rotational velocity do not match within a predetermined range of acceptable deviation, then a problem may be developing within the assembly 10, or in a component in communication with the assembly 10.

Figure 8:
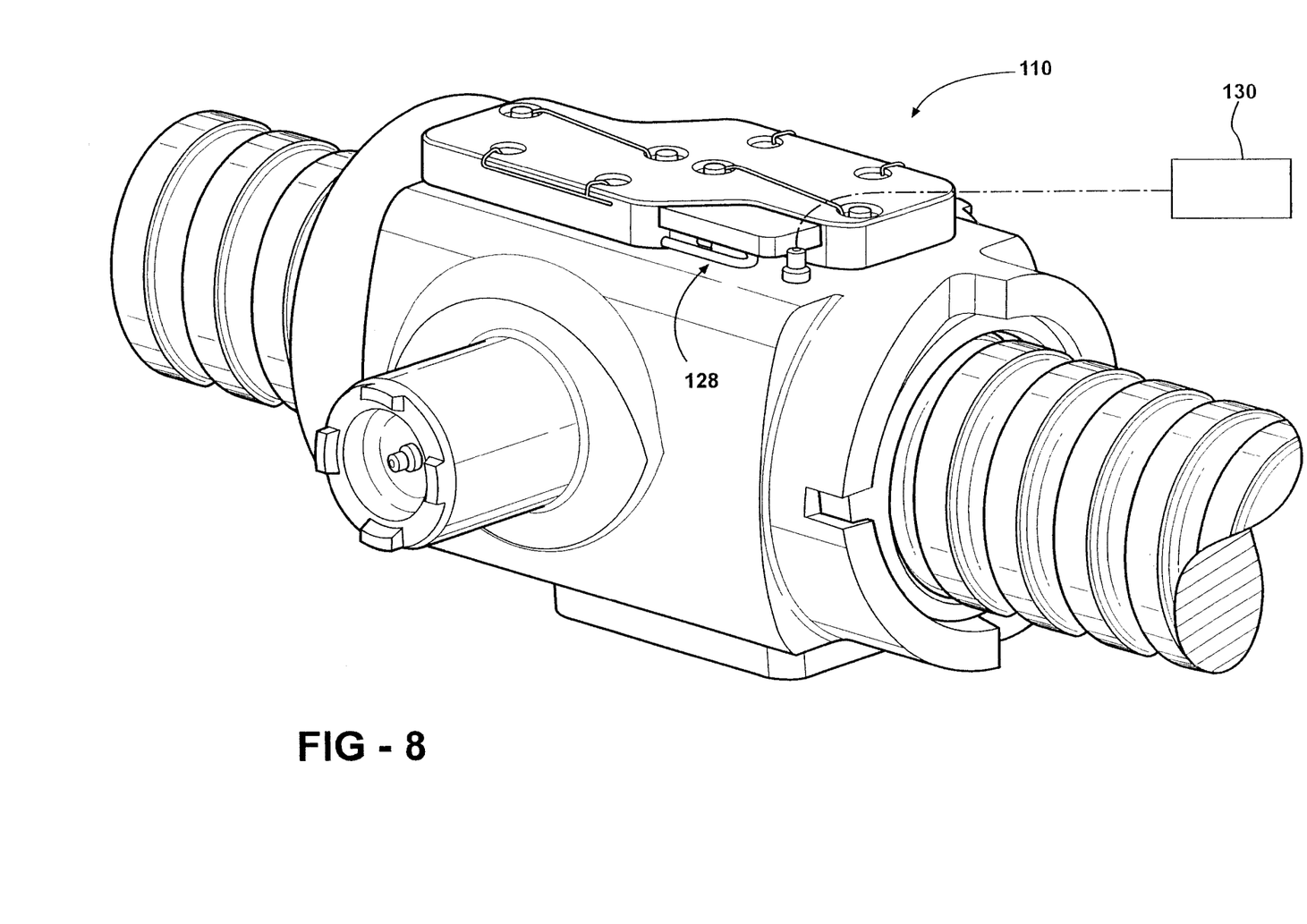
FIG. 8 is a perspective view of ball screw assembly with a self-energized sensing device according to another presently preferred aspect of the invention.
Figure 9:
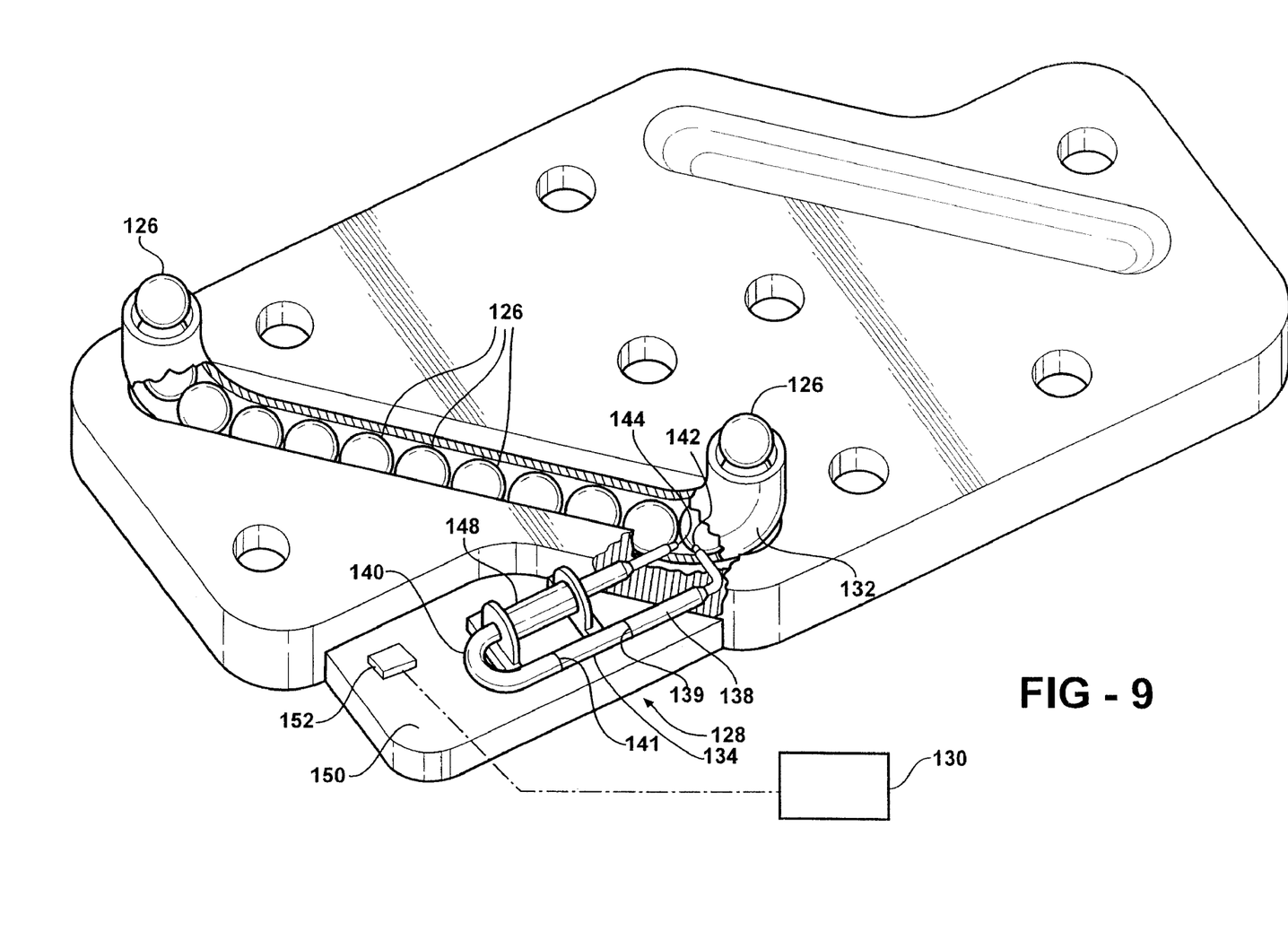
FIG. 9 is a bottom perspective view of a return tube cover with a fragment removed therefrom showing a portion of the self-energized sensing device.

Another embodiment of a ball screw assembly 110 is shown in FIG. 8, wherein reference numbers offset by 100 are used to identify similar features as described in the first embodiment above. The ball screw assembly 110 has ball return tubes 132 (FIG. 9), rather than the internal return shown in the previously linear motion assembly 10. The ball return tubes 132 span a number of helical grooves within the ball nut 116. The return tubes 132 have opposite end fingers (truncated and not shown) to deflect the balls 126 from the ball circulating track into the passages of the ball return tubes 132 and to return the balls 126 to the ball circulating track to provide the closed loop recirculation of the balls 126. The inlet and outlet of the return tubes 132 reverse rolls with one another when the direction of rotation of the screw 114 and nut 116 is reversed, as is known.

The ball screw assembly has a sensing device 128, as described above, arranged in operable communication with a control module 130, as described above. The sensing device 128 includes a permanent magnet 134, first and second ferrous conductors 138, 140 with respective ends 139, 141 attached to the magnet 134 and free ends 142, 144 extending therefrom, an inductor coil 148, a PCB 150 and a microprocessor 152. The sensing device 128 functions the same as described above, and thus, the details pertaining thereto are not discussed further. The free ends 142, 144 of the first and second ferrous conductors 138, 140 are shown as being disposed adjacent the inlet and outlet of the return tubes 132, as this is the most common area for ball jams to occur. The free ends 142, 144 are arranged as described above, such that the balls 126 remain substantially equidistant from both ends 142, 144 as they pass thereby. As such, the gap 146 provided between the free ends 142, 144 is minimized as the balls 126 are directly beneath the free ends 142, 144. Accordingly, FIG. 7 is representative of the micro-current generated in the coil 148 as the magnetic flux flows through the second ferrous conductor 140, and thus, the desired attributes to be monitored for the assembly 110 can be detected, as described above.

Figure 10:
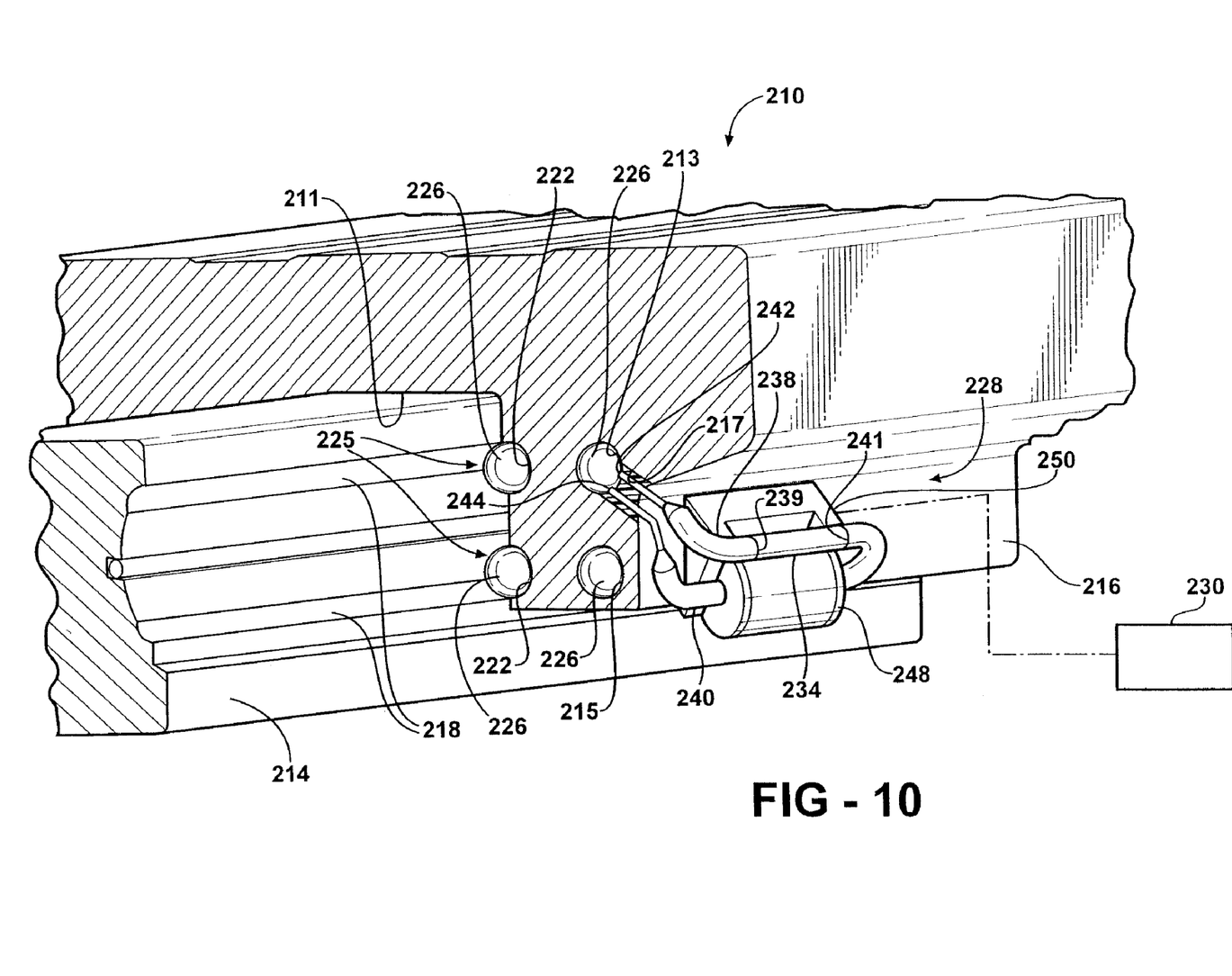
FIG. 10 is a partial perspective cross-sectional view of a linear slide with a self-energized sensing device according to yet another presently preferred aspect of the invention.

Another embodiment of a linear motion assembly 210 is shown in FIG. 10, wherein reference numbers offset by 200 are used to identify similar features as described in the first embodiment above. The linear motion assembly takes the form of a linear rail assembly 210 having a first body or elongate rail 214 arranged for operable communication with a second body or carriage 216 for translation of the carriage 216 along the rail 214. The rail 214 and carriage 216 have opposite sides, with only one side being shown here for simplicity, since they are the same, with a recessed rail track being formed in the rail 214 including upper and lower grooves 218.

The carriage 216 has a recessed pocket 211 between the opposite sides sized for at least partial receipt of the rail 214. The opposite sides have upper and lower grooves 222 arranged opposite the upper and lower grooves 218 of the rail 214 to provide upper and lower raceways or circulating tracks 225. Further, the opposite sides have upper and lower ball return channels 213, 215 with ball return tubes (not shown) arranged to re-circulate the balls 226 in upper and lower ball circulating tracks 225 provided by the upper and lower raceways and the upper and lower return channels 213, 215. The return tubes can be carried by the carriage 216 or the rail 214. The balls 226 permit linear translation of the rail 214 and carriage 216 relative to one another with relatively low friction resulting between them. Preferably, the balls 226 are preloaded within each of the ball circulating tracks 225 to allow the carriage 216 to be maintained in spaced relation from the rail 214 to allow generally low frictional linear movement of the carriage 216 along the rail 214.

The linear rail assembly 210 has a sensing device 228, as described above in the first embodiment, arranged in operable communication with a control module 230. The sensing device 228 includes a permanent magnet 234, first and second ferrous conductors 238, 240 with respective ends 239, 241 attached to the magnet 234 and free ends 242, 244 extending therefrom, an inductor coil 248, a PCB 250 and a microprocessor (not shown). The sensing device 228 functions the same as described above, and thus, the details pertaining thereto are not discussed further. The free ends 242, 244 of the first and second ferrous conductors 238, 240 are shown as being disposed in a pocket 217 extending into one of the return channel, shown here as being the upper return channel 213, for example. The free ends 242, 244 are arranged in the upper channel 213 as described above, such that the balls 226 remain substantially equidistant from both ends 242, 244 as they pass the free ends 242, 244. As such, the gap provided between the free ends 242, 244 is minimized as the balls 226 are directly in front of the free ends 242, 244. Accordingly, FIG. 7 is representative of the alternating micro-current generated in the coil 248 as the magnetic flux flows through the second ferrous conductor 240.

Figures 11, 12:
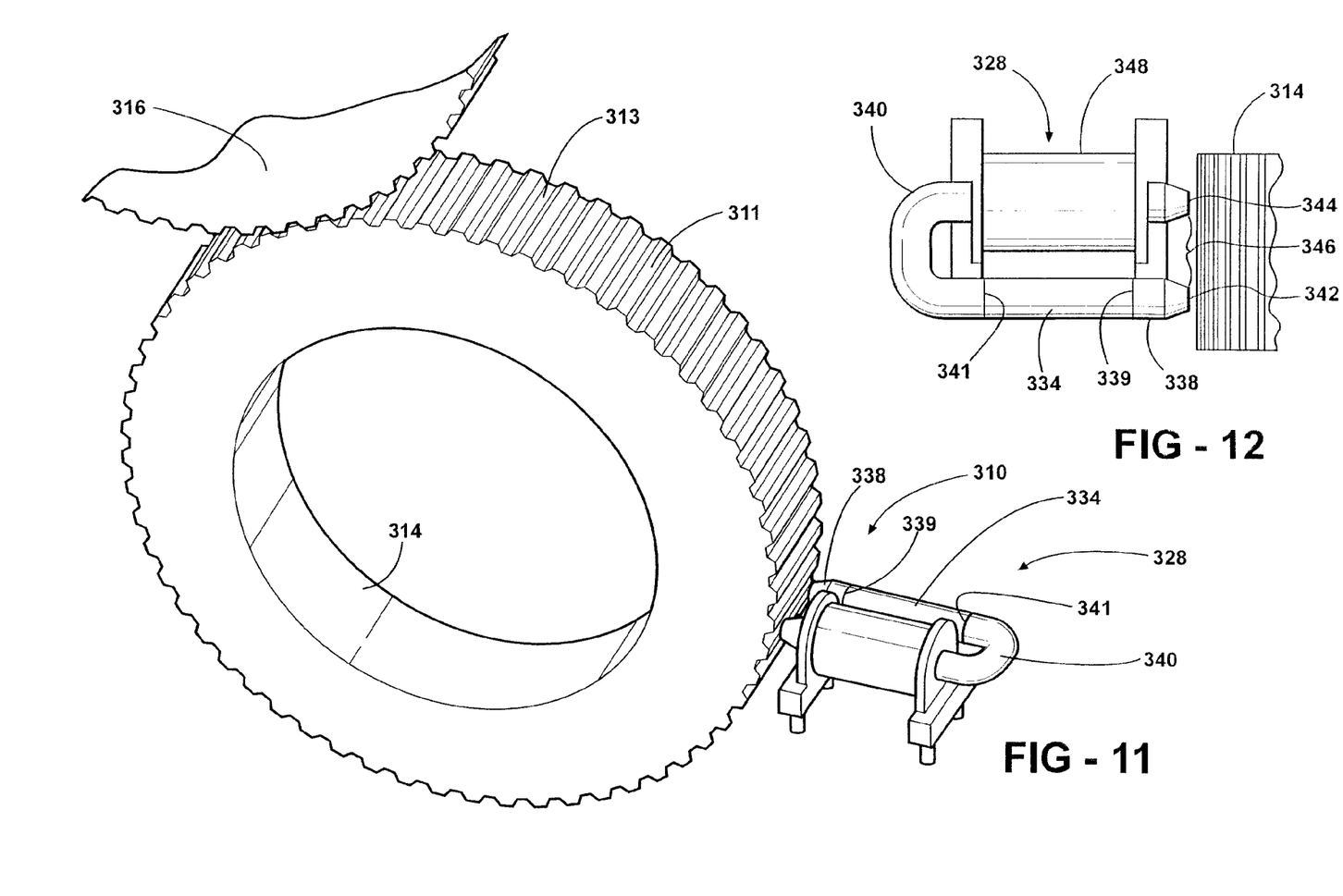
FIG. 11 is a partial perspective view of a gear train with a self-energized sensing device according to still yet another presently preferred aspect of the invention.
FIG. 12 is a plan view of FIG. 11.

Another embodiment of a rotational motion assembly constructed in accordance with the invention is shown generally at 310 in FIG. 11, wherein reference numbers offset by 300 are used to identify similar features as described in the first embodiment above. The rotational motion assembly 310 takes the form of a gear train assembly 310 having a first body or first gear 314 arranged for operable communication with a second body or second gear 316 for rotation of the gears 314, 316 relative to one another. The first and second gears 314, 316 are represented as spur gears having gear teeth 311 spaced from one another by roots or valleys 313, wherein the gear teeth of the respective gears 314, 316 project outwardly for meshed engagement with one another, as is known.

The gear train assembly 310 has a sensing device 328, as described above, arranged in operable communication with a control module (not shown). The sensing device 328 includes a permanent magnet 334, first and second ferrous conductors 338, 340 with respective ends 339, 341 attached to the magnet 334 and free ends 342, 344 extending therefrom, an inductor coil 348, a PCB (not shown) and a microprocessor (not shown). The sensing device 328 functions the same as described above, and thus, the details pertaining thereto are not discussed further. The free ends 342, 344 of the first and second ferrous conductors 338, 340 are shown as being disposed adjacent one of the gears, and can be used adjacent both of the gears to determine their respective operating characteristics. The free ends can be arranged in any configuration to detect the presence of the teeth 311, regardless of the type of gears. For example, the gears could be helical gears, or otherwise. As each gear tooth 311 passes by the free ends 342, 344, the gap 346 is substantially closed, thereby completing the circuit to enable the magnet flux from the permanent magnet 334 to impart an electromotive force on the coil 348, and sending the signal to the microprocessor and to the controller. Accordingly, FIG. 7 is representative of the current generated in the coil 348 as the magnetic flux flows through the second ferrous conductor 340.

The embodiments of the linear and rotational motion assemblies and monitoring systems discussed above are intended to illustrate some presently preferred embodiments, and are not limiting. Various modifications within the spirit and scope of the invention will be readily apparent to those skilled in the art. The invention is defined by the claims that follow.

What is claimed is:

1. A linear motion assembly, comprising:
   a first body;
   a second body;
   a plurality of recirculating ferrous rolling elements disposed between said first body and said second body to enable low friction translation of said first body and said second body relative to one another;
   a permanent magnet carried by one of said first body or said second body;
   a pair of ferrous conductors, one of said ferrous conductors being attached to said permanent magnet to carry magnetic flux therefrom and the other of said ferrous conductors being attached to said permanent magnet to return the magnetic flux thereto, each of said ferrous conductors having a free end;
   a microprocessor;
   an inductor coil wound about one of said ferrous conductors, said inductor coil being arranged in communication with said microprocessor;
   said free ends being spaced from one another by a gap to provide an open circuit between said free ends; said gap being substantially closed by the presence of said ferrous rolling elements to provide a closed circuit, said closed circuit imparting an electromotive force on said inductor coil; and
   said microprocessor detecting the presence of said ferrous rolling elements closing said gap from said electromotive force and the absence of said ferrous rolling elements across said gap from said open circuit.

2. The linear motion assembly of claim 1 wherein said first body is a screw having a helical external groove, said second body is a nut having a through-bore including a helical internal groove, said external groove and said internal groove providing at least one ball track, and said ferrous rolling elements being balls arranged for recirculation in said at least one ball track.

3. The linear motion assembly of claim 2 further comprising a recirculation member to redirect said balls in a circuitous path in said at least one ball track, said free ends of said ferrous conductors being fixed in said recirculation member.

4. The linear motion assembly of claim 1 further comprising a printed circuit board, said inductor coil and said microprocessor being arranged in electrical communication on said printed circuit board.

5. The linear motion assembly of claim 1 wherein said first body is an elongate rail and said second body is a carriage supported for translation along said rail.

6. The linear motion assembly of claim 1 wherein the microprocessor is configured to calculate the velocity of the ferrous elements in response to a detected frequency of the passage of the ferrous elements.

7. The linear motion assembly of claim 1 wherein the microprocessor is configured to interpret a signal indicating when said ferrous elements moving or stationary.

8. The linear motion assembly of claim 1 wherein the microprocessor is configured to interpret a signal indicating when said ferrous elements are damaged.

9. A method of detecting the movement of rolling ferrous elements in a linear motion assembly, comprising:
   providing a permanent magnet having north and south poles;
   establishing a circuit through which magnetic flux can flow outwardly from the north pole and return to the south pole;
   providing a gap in the circuit;
   arranging a microprocessor in electrical communication with the circuit to detect current flow within the circuit upon the rolling ferrous elements closing the gap and to detect the lack of current flow upon the gap remaining open;
   attaching an end of a first ferrous conductor to said north pole of said permanent magnet and arranging a free end of said first ferrous conductor in a predetermined location relative to said ferrous elements;
   attaching an end of a second ferrous conductor to said south pole of said permanent magnet and arranging a free end of said second ferrous conductor in a predetermined location relative to said ferrous elements to provide said gap between said free ends of said first and second ferrous conductors, said gap being open to provide the open circuit between said free ends in the absence of said ferrous elements and substantially closed to provide a closed circuit in the presence of said ferrous elements;
   disposing an inductor coil about one of said ferrous conductors;
   arranging said microprocessor in communication with said inductor coil; and
   configuring said microprocessor to detect the presence of the ferrous elements across said gap when said gap is substantially closed and to detect the absence of said ferrous elements across said gap when said gap is open; and
   fixing the free ends of the first and second ferrous conductors in a recirculation member and redirecting the rolling ferrous elements in a circuitous ball track of the linear motion assembly with the recirculation member.

* * * * *